(12) United States Patent
Kobayashi et al.

(10) Patent No.: US 6,727,947 B1
(45) Date of Patent: Apr. 27, 2004

(54) DIGITAL CAMERA

(75) Inventors: Akio Kobayashi, Kyotanabe (JP); Toru Asaeda, Daito (JP); Hidefumi Okada, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/318,611

(22) Filed: May 26, 1999

(30) Foreign Application Priority Data

May 29, 1998 (JP) .......................... 10-149826

(51) Int. Cl.[7] .................. H04N 5/262; H04N 5/222
(52) U.S. Cl. ............... 348/333.01; 348/333.11; 348/333.12; 348/240.2
(58) Field of Search .................. 348/333.01, 240.2, 348/333.11, 333.12

(56) References Cited

U.S. PATENT DOCUMENTS

| | | | | |
|---|---|---|---|---|
| 4,791,308 A | * | 12/1988 | Nagashima | 348/240.99 |
| 5,029,006 A | * | 7/1991 | Katsumata et al. | 348/581 |
| 5,043,811 A | * | 8/1991 | Yasuhiro | 348/458 |
| 5,172,234 A | * | 12/1992 | Arita et al. | 348/240.2 |
| 5,355,178 A | * | 10/1994 | Parulski | 348/620 |
| 5,581,301 A | * | 12/1996 | Ninomiya | 348/342 |
| 5,596,346 A | * | 1/1997 | Leone et al. | 345/667 |
| 5,754,230 A | * | 5/1998 | Tsuruta | 348/333.12 |
| 5,805,300 A | * | 9/1998 | Fukushima | 358/404 |
| 5,845,011 A | * | 12/1998 | Miyamoto et al. | 382/232 |
| 6,061,098 A | * | 5/2000 | Nie et al. | 348/582 |
| 6,278,447 B1 | * | 8/2001 | Anderson | 345/723 |
| 6,288,754 B1 | * | 9/2001 | Ito | 348/663 |
| 6,304,292 B1 | * | 10/2001 | Ide et al. | 348/243 |
| 6,434,281 B1 | * | 8/2002 | Sakaegi | 382/305 |
| 6,507,711 B2 | * | 1/2003 | Maruyama | 396/374 |
| 6,522,360 B1 | * | 2/2003 | Miyawaki et al. | 348/347 |

FOREIGN PATENT DOCUMENTS

| | | |
|---|---|---|
| JP | 05-037867 | 2/1993 |
| JP | 05-268504 | 10/1993 |

* cited by examiner

*Primary Examiner*—Andrew Christensen
*Assistant Examiner*—Brian Genco
(74) *Attorney, Agent, or Firm*—Westerman, Hattori, Daniels & Adrian, LLP (57) ABSTRACT

Digital camera includes a CCD imager having VGA resolution. The camera signal of subject image taken by the CCD imager is subjected to a predetermined process by a signal processing circuit, whereby image data is created having 640 pixel×980 lines. Meanwhile, a CPU enables cut-out circuit when a 1-tims mode is set by a zoom button, and a cut-out circuit when a 2-times mode is set by the zoom button. The thin-out circuit performs thinning out pixel data, every other pixels and lines, on the image data having 640 pixels×480 lines, outputting image data having 320 pixels× 240 lines. The cut-out circuit cuts 320 pixels×240 lines of image data from a center of the image data of 640 pixels× 480 lines.

5 Claims, 9 Drawing Sheets

| | | | | | |
|---|---|---|---|---|---|
| 31 | U30 | V30 | U31 | V31 | ⎫ |
| ⋮ | | | | | |
| 17 | U2 | V2 | U3 | V3 | |
| 16 | U0 | V0 | U1 | V1 | |
| 15 | Y60 | Y61 | Y62 | Y63 | ⎬ BANK 1 |
| ⋮ | | | | | |
| 1 | Y4 | Y5 | Y6 | Y7 | |
| 0 | Y0 | Y1 | Y2 | Y3 | ⎭ |
| 31 | U30 | V30 | U31 | V31 | ⎫ |
| ⋮ | | | | | |
| 17 | U2 | V2 | U3 | V3 | |
| 16 | U0 | V0 | U1 | V1 | |
| 15 | Y60 | Y61 | Y62 | Y63 | ⎬ BANK 2 |
| ⋮ | | | | | |
| 1 | Y4 | Y5 | Y6 | Y7 | |
| 0 | Y0 | Y1 | Y2 | Y3 | ⎭ |

DIGITAL CAMERA

BACKGROUND OF THE INVENTION

1. Field of the Invention

This invention relates to digital cameras and, more particularly, to a digital camera which creates an image signal having a desired zoom magnification.

2. Description of the Prior Art

In the conventional digital cameras of this kind, where creating a zoom image signal having a desired zoom magnification from an image signal due to picture taking, the image signal has been once stored into a field memory. Thereafter the image signal has been subjected to a zooming process by using a line memory, adder, multiplier and so on.

In such conventional arts, however, the zooming process has required such circuits as a field memory, line memory, adder, multiplier, etc., thus resulting in a problem of complicated circuit configuration.

SUMMARY OF THE INVENTION

Therefore, it is a primary object of the present invention to provide a digital camera which is capable of creating an image signal having a desired zoom magnification through a simplified circuit configuration.

According to the present invention, a digital camera, comprising: a picture taking means for taking a picture of a subject and outputting a first image signal having a first number of pixels; a creating means for creating a second image signal having a second number of pixels smaller than said first number of pixels by extracting a predetermined pixel signal from said first image signal; a setting means for setting a zoom magnification; and a change means for changing a position of extracting said image signal depending upon said zoom magnification.

If a first image signal having a first numbers of pixels is outputted from the picture taking means, the creating means extracts a predetermined pixel signal from the first image signal to create a second image signal having a second number of pixels. Here, the position of extracting the image signal is changed depending upon a zoom magnification set by the setting means.

According to the present invention, a second image signal with a desired zoom magnification can be obtained by changing the position of extracting the pixel signal from the first image signal. Thus, the circuit configuration can be simplified.

In a certain aspect of the present invention, the creating means includes a thin-out means and a cut-out means. The thin-out means subject the first image signal to thinning out into a second image signal. The cut-out means cuts out a predetermined portion of the first image signal into a second image signal. Due to this, the change means activates selectively the thin-out means and the cut-out means depending upon a zoom magnification.

In a certain embodiment of the present invention, the activating means activates the thin-out means when a 1-times zoom magnification is set, and the cut out means when a 2-times zoom magnification is set.

In another aspect of the present invention, the thin-out means includes a plurality of registers and an enabling means. The registers cause the first image signal to shift by a first predetermined amount a time, and the enabling means intermittently enables these registers.

In a certain embodiment of the present invention, the first image signal includes a signal, a U signal and a V signal which are different in data amount one another, and the registers includes a plurality of first registers and a plurality of second registers. The Y signal is shifted by 1 pixel a time by the first registers, whereas the U signal and the V signal are shifted by 1 pixel a time and alternately by the second registers. Also, the enabling means includes a first enabling means and a second enabling means. The first enabling means intermittently enables the first registers for a 1-pixel period a time, while the second enabling means intermittently enables the second registers for a 2-pixel period a time.

In other aspects of the present invention, the cut-out means cuts a second image signal in the following manner. That is, a request output means outputs a request to read the first image signal held in the buffer. A gate means applies gating to some read request. A read means responds to the read request outputted from the gate means and reads the first image signal out of the buffer. Incidentally, the request output means output the read request each time the first image signal is written in a second predetermined amount to the buffer.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7(A) is a waveform diagram showing a horizontal synchronizing signal;

FIG. 7(B) is a waveform diagram showing a 12 MHz clock;

FIG. 7(C) is an illustrative view showing Y data;

FIG. 7(D) is an illustrative view showing UV data;

FIGS. 7(E)–(G) are waveform diagrams showing an enable signal;

FIGS. 7(H) and (I) are illustrative views showing an output of an D-FF circuit;

FIG. 7(J) is a waveform diagram showing a signal SW;

FIG. 7(K) is an illustrative view showing an output of SW;

FIG. 7(L) is an illustrative view showing an address signal;

FIG. 7(M) is a waveform diagram showing a bank switch signal;

FIG. 7(N) is a waveform diagram showing a read request;

DETAILED DESCRIPTION OF THE PREFERRED EMBODIMENTS

Figure 1:
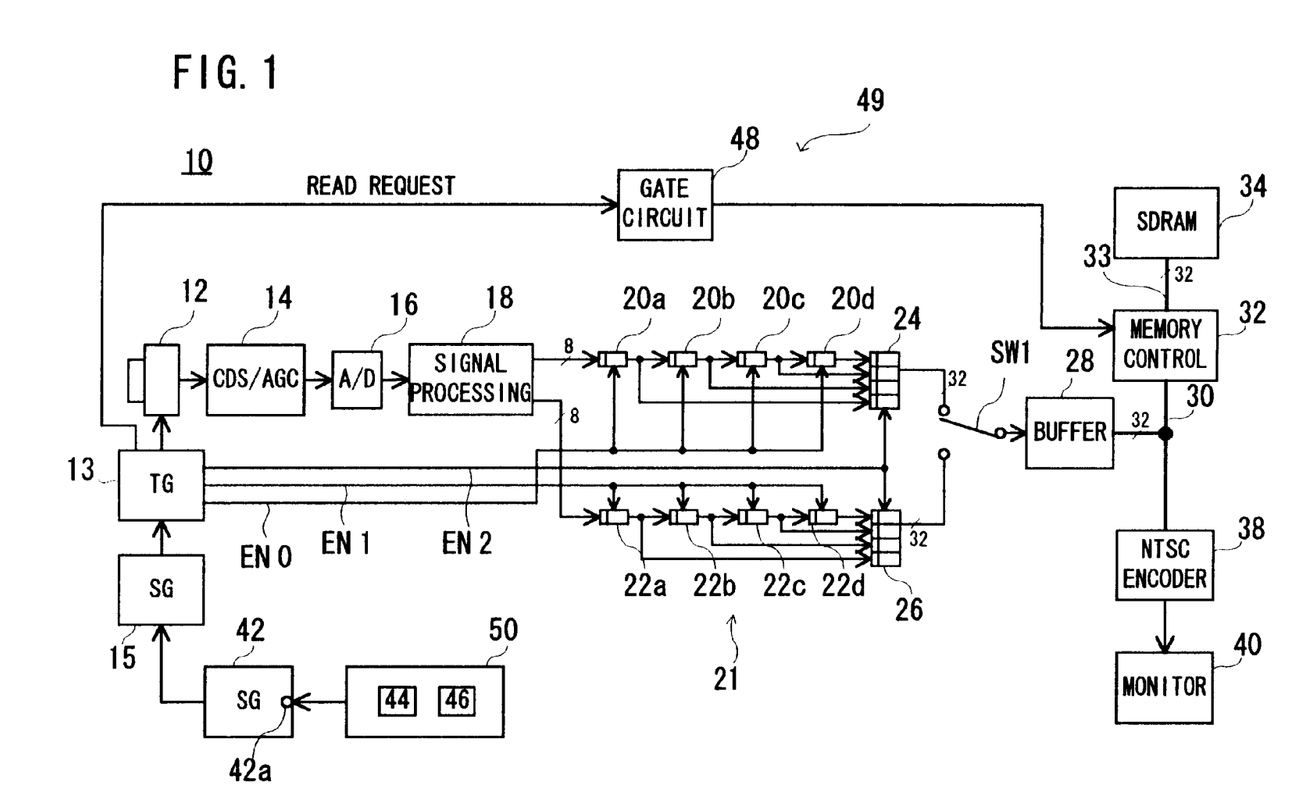
FIG. 1 is a block diagram showing one embodiment of the present invention.

Referring to FIG. 1, a digital camera 10 in this embodiment includes a CCD imager 12 having an effective number of pixels of horizontally "640" by vertically "480". The CCD imager 12 is mounted, at a front, with a primary color filter (not shown) so that a subject optical image is given through this primary color filter to the CCD imager 12.

Figure 6:
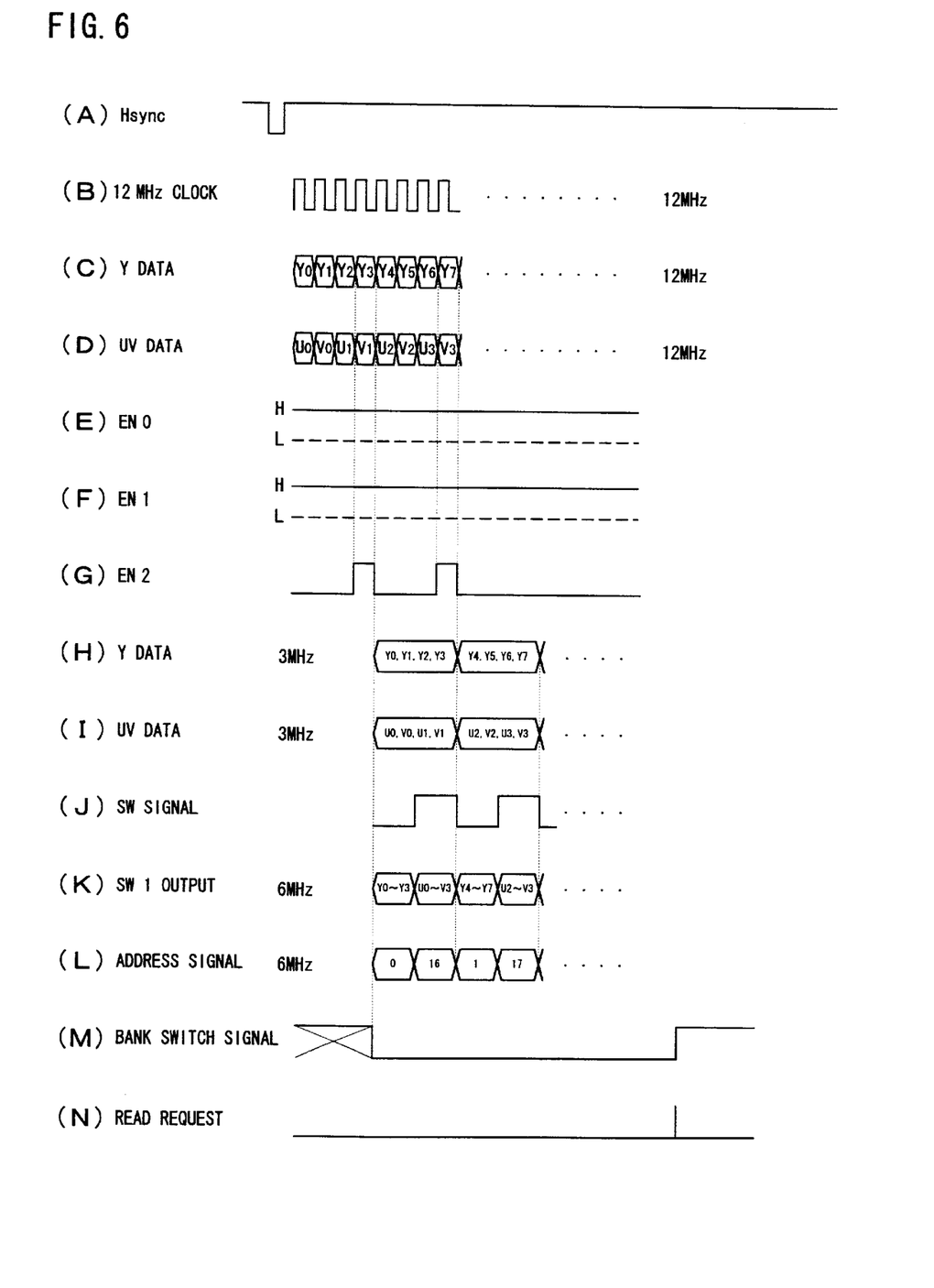
FIG. 6(A) is a waveform diagram showing a horizontal synchronizing signal.
FIG. 6(B) is a waveform diagram showing a 12 MHz clock.
FIG. 6(C) is an illustrative view showing Y data.
FIG. 6(D) is an illustrative view showing UV data.
FIGS. 6(E)–(G) are waveform diagrams showing an enable signal.
FIGS. 6(H)–(I) are illustrative views showing an output of a D-FF circuit.
FIG. 6(J) is a waveform diagram showing a signal SW.
FIG. 6(K) is an illustrative view showing an output of SW.
FIG. 6(L) is an illustrative view showing an address signal.
FIG. 6(M) is a waveform diagram showing a bank switch signal.
FIG. 6(N) is a waveform diagram showing a read request.
Figure 7:
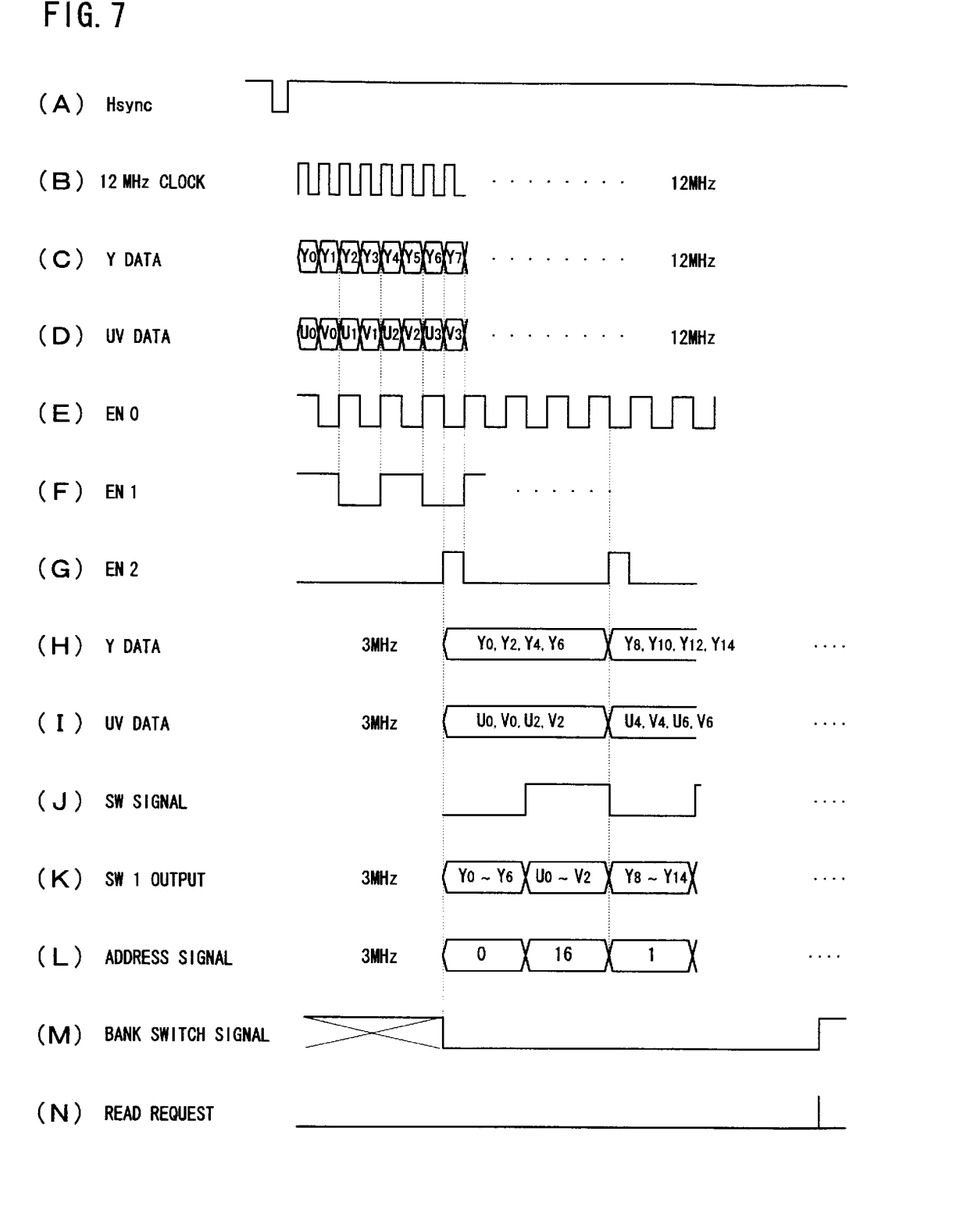

The CCD imager 12 is driven by a timing signal outputted from a timing generator (TG) 13, in response to turning on a power. That is, if an operator turns on the power, a system controller 50 gives a camera mode setting to a CPU 42 through an interrupt terminal 42a. Thereupon, the CPU 42 causes a signal generator (SG) 15 to start operating. The signal generator (SG) 15, in turn, outputs a horizontal synchronizing signal as shown in FIGS. 6(A) and 7(A) as well as a not-shown vertical synchronizing signal. The TG 13 creates a timing signal based on the horizontal and vertical synchronizing signals, and drives the CCD imager 12 by a progressive scan scheme.

The CCD imager 12 outputs a camera signal as a primary color signal having pixels each having any of primary color components R, G and B. The output camera signal is subjected to well-known noise removal and level adjustment by a CDS/AGC circuit 14, and then converted into digital-signal camera data by an A/D converter 16 operating at a clock rate of 12 MHz. A signal processing circuit 18 performs YUV conversion with a ratio of 4:2:2 on the camera data outputted from the A/D converter, thus creating image data, or YUV data.

The signal processing circuit 18 responds to the horizontal and vertical synchronizing signals given from the SG 15 and a 12 MHz clock shown in FIG. 6(B) or 7(B), and effects the above-mentioned signal processing. As a result, Y data and UV data respectively as shown in FIGS. 6(C) and 6(D), or Y data and UV data respectively as shown in FIGS. 7(C) and 7(D), are outputted simultaneously through two signal paths. Incidentally, each of the Y data, U data is 8 bits per pixel.

Upon turning on the power, the system controller 50 sets a normal camera mode, with a result that a motion picture in VGA resolution is displayed on a monitor 40. In the normal camera mode is displayed a 1-times zoomed motion picture having 640 pixels×480 lines, on the monitor 40. If an operator at this time operates a zoom button 62, then the system controller 50 sets a zoom mode, thereby displaying a motion picture with QVGA resolution on the monitor. The zoom mode includes a 1-times zoom mode and a 2-times zoom mode. In the 1-times zoom mode, displayed on the monitor 40 is a motion picture having 320 pixels×240 lines due to thinning out every other pixels. In the 2-times zoom mode is displayed a motion picture having 320 pixels×240 lines due to cutting out or zooming in a central portion of the screen. In order to enable displaying a motion picture in compliance with a mode being set as above, the image data outputted from the signal processing circuit 18 is subjected to signal processing as follows.

In the normal camera and 2-times zoom modes, an enable signal EN0 shown in FIG. 6(E) is outputted from the TG 13 to D-FF circuits 20a–20d that are in serial connection. The D-FF circuits 20a–20d are always enabled so that their input data are latched responsive to the 12 MHz clock. That is, the D-FF circuits 20a–20d latch, on each pixel basis, Y data consecutively outputted from the signal processing circuit 18 as shown in FIG. 6(C), and input them simultaneously to a D-FF circuit 24. The D-FF circuit 24 is simultaneously inputted by horizontally succeeding 4 pixels, or 32 bits, of Y data.

On the other hand, D-FF circuits 22a–22d connected in serial are inputted by an enable signal EN1 shown in FIG. 6(F). The D-FF circuits 22a–22d are also enabled at all times and to thereby latch input data in response to the 12 MHz clock. Due to the 4:2:2 conversion, each of the U data and the V data has a data amount of ½ of that of the Y data. Consequently, in a duration that 4 pixels of Y data are outputted through one signal path, 2 pixels of U data and the V data are outputted through the other signal path. The U data and the V data are alternately switched over every 8 bits, as shown in FIG. 6(D). Such 2 pixels of UV data are simultaneously inputted to a D-FF circuit 26 through the D-FF circuits 22a–22d.

The D-FF circuits 24 and 26 latch their input data in response to an enable signal EN2 rising for a 1-clock period at a 3-clock interval as shown in FIG. 6(G). As a result, 32-bit Y data and UV data are respectively outputted in timing of FIGS. 6(H) and 6(I) from the D-FF circuits 24 and 26. The outputs of the D-FF circuits 24 and 26 are supplied to a switch SW1 where they are subjected to time division multiplex by an SW signal varying at a 2-clock interval as shown in FIG. 6(J). Through the switch SW1 is outputted YUV data in time division multiplex as shown in FIG. 6(K). This YUV data has a data amount of 640 pixels×480 lines, with a transfer rate of 6 MHz.

On the contrary, in the 1-times zoom mode, an enable signal EN0 shown in FIG. 7(E) is inputted from the TG 13 to the D-FF circuits 20a and 20d, an enable signal EN1 shown in FIG. 7(F) is inputted from the TG 13 to the D-FF circuits 22a–22d, and an enable signal EN2 shown in FIG. 7(G) is inputted from the TG 13 to the D-FF circuits 24 and 26. The D-FF circuits 20a–20d are enabled at an interval of a 1-clock period whereby the Y data shown in FIG. 7(C) outputted from the signal processing circuit 18 is latched every other pixels. As a result, 4 pixels of Y data having been horizontally thinned out every other pixels are simultaneously inputted to the D-FF circuit 24.

The D-FF circuits 22a–22d are intermittently enabled by the enable signal EN1 of FIG. 7(F) at an interval of a 2-clock period. Due to this, the Y data and the V data showing FIG. 7(D) outputted from the signal processing circuit 18 also latched every other pixels. That is, because the U data and the V data corresponding to a predetermined 1 pixel are outputted for the 2-clock period, the U data and the V data are latched every other pixels by the enable signal EN1 varying in level at the interval of 2 clocks. This causes the 2-pixel UV data having been horizontally thinned out every other pixels is simultaneously inputted to the D-FF circuit 26.

The D-FF circuits 24 and 26 latch their input data in response to the enable signal EN2 shown in FIG. 7(G). The enable signal EN2 becomes a high level for a 1-clock period at an interval of 7 clocks whereby 32-bit Y data and UV data are outputted respectively from the D-FF circuits 24 and 26 in timing as shown in FIGS. 7(H) and 7(I). The SW signal varies at an interval of 4 clocks as shown in FIG. 7(J) so that the switch SW1 outputs time-divisionally multiplexed YUV data as shown in FIG. 7(K). This YUV data has a data amount of 320 pixels×240 lines, with a transfer rate of 3 MHz.

As will be understood from the above explanation, the D-FF circuits 20a–20d, 22a–22d, 24 and 26 as well as the TG 13 constitute for a thin-out circuit 21. The thin-out circuit 21 thus configured is enabled/disabled by the CPU depending upon a mode. That is, if the normal camera or 2-times zoom mode is set, the thin-out circuit 21 is disabled. As a result, created is image data having 1-times zoom magnification and VGA resolution. When a 1-times zoom mode is set, the thin-out circuit 21 is enabled thereby creating image data having 1-times zoom magnification and QVGA resolution.

Figure 2:
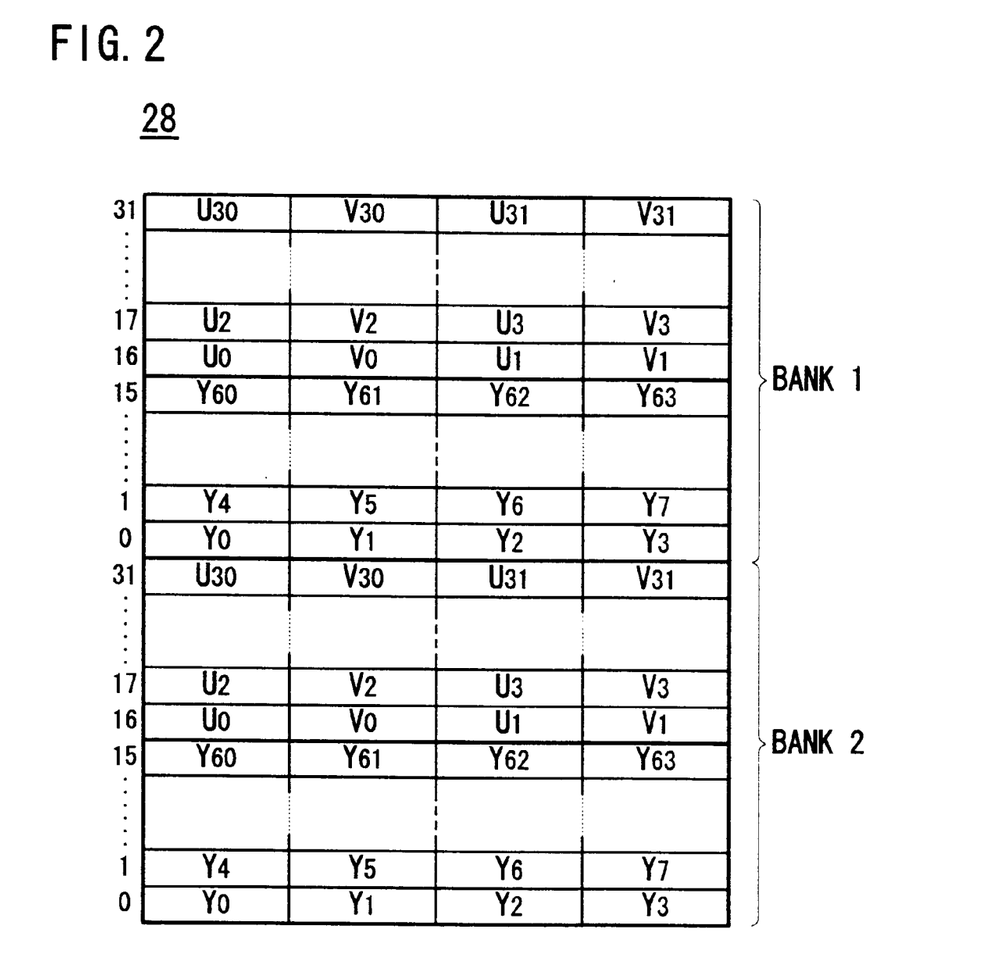
FIG. 2 is an illustrative view showing a buffer.

A buffer 28 is configured by a dual-port SRAM as shown in FIG. 2. The buffer 28 has a memory area divided into 2 banks. Each bank has the number of words of "32", wherein each word has a capacity of 32 bits. That is, each bank can afford to store 64 pixels of YUV data. The YUV data outputted through the switch SW1 is inputted to the buffer 28 constructed like this.

The TG 13, in the normal camera or 2-times zoom mode, supplies to the buffer 28 an address signal shown in FIG. 6(L) and bank switch signal shown in FIG. 6(M). On the other hand, the TG 13 in the 1-times zoom mode supplies to the buffer 28 an address signal shown in FIG. 7(L) and bank switch signal shown in FIG. 7(M). In each mode, the address signal and the bank switch signal are given in synchronism with the YUV data. As a result, in normal camera or 2-times zoom mode horizontally-successive 64-pixels YUV data is written into one of the banks. In the 1-times zoom mode, 64-pixels YUV data having been horizontally thinned out every other pixels is written to one of the banks. The Y data is stored in a former half of 16 words of a bank whereas the UV data is to a latter half of the 16 words.

Incidentally, because in the 1-times zoom mode the pixel data is thinned out every other pixels, it takes twice in time to write 64 pixels as compared to the normal camera mode or 2-times zoom mode. Meanwhile, FIG. 2 shows one example of pixel data written on the buffer 28 in the normal camera or 2-times zoom mode.

The YUV data on each bank is read out by the memory control circuit 32, based on a read request outputted from the TG 13. The read request, as will be understood from FIGS. 6(N) and 7(N), is created in synchronism with a rise or fall of a bank switch signal. However, the read request is inputted to a gate circuit 48 before to the memory control circuit 32 so that a predetermined read request is applied by gating depending upon the mode. The memory control circuit 32 responds only to a read request outputted from the gate circuit 48 and reads image data out of the buffer 28. The read-out image data is written to the SDRAM 34 through buses 30 and 33.

In the normal camera mode, a gate signal assumes a high level over a 1-line period as shown in FIG. 8(G) whereby 10 read requests shown in FIG. 8(F) are inputted to the memory control circuit 32 during the 1-line period. The memory control circuit 32, during the 1-line period, reads 640 pixels of image data out of the buffer 28 and writes it to the SDRAM 34. The gate circuit 48 outputs a gate signal shown in FIG. 8(G) for each line. Because in the normal camera mode the thin-out circuit 21 is in disabled, all the image data having 640 pixels×480 lines is inputted to the memory control circuit 32 and written to the SDRAM 34.

Figure 8:
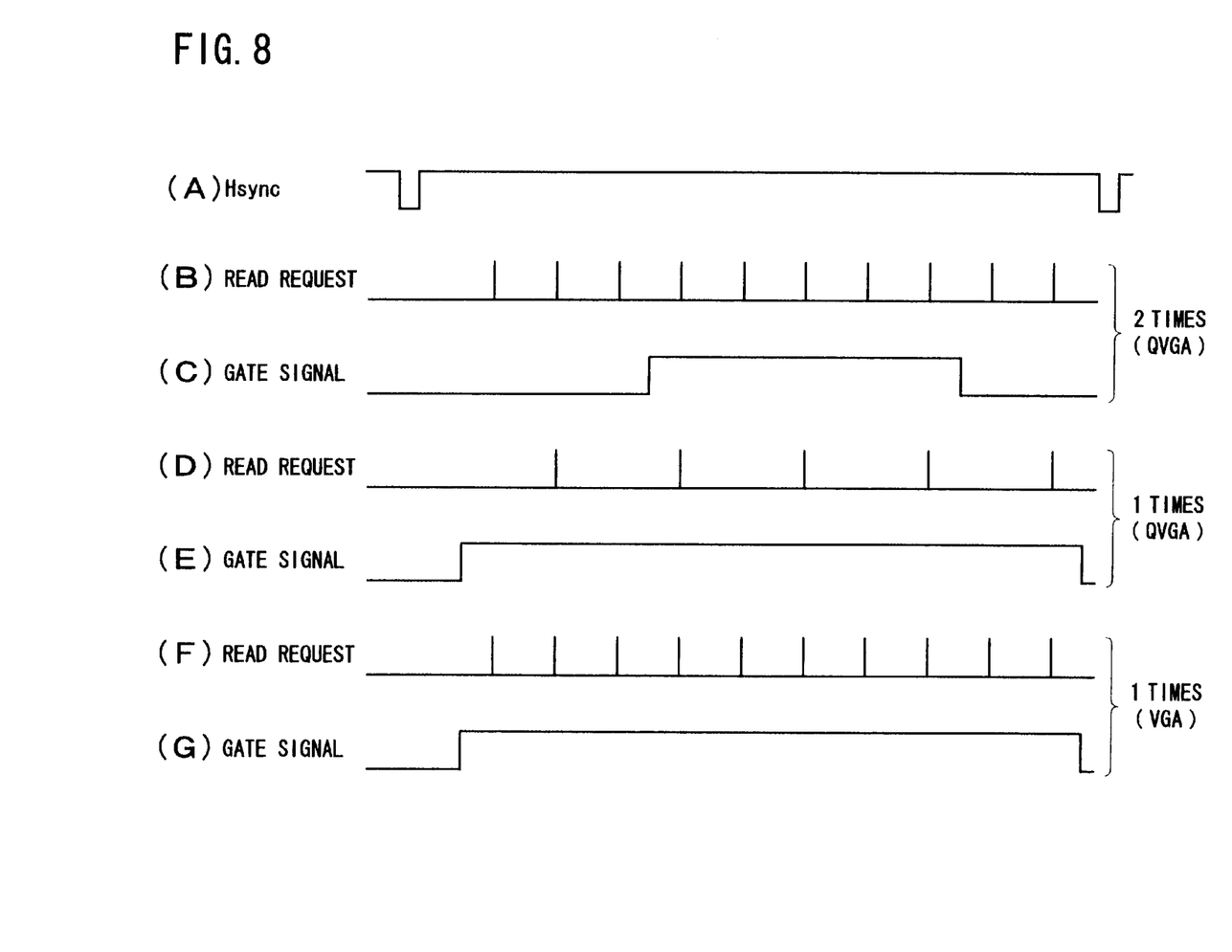
FIG. 8(A) is a waveform diagram showing a horizontal synchronizing signal.
FIG. 8(B), FIG. 8(D) and FIG. 8(F) are waveform diagrams showing a read request.
FIG. 8(C), FIG. 8(E) and FIG. 8(G) are waveform diagrams showing a gate signal.

In also the 2-times zoom mode, the thin-out circuit 21 is disabled and 640 pixels×480 lines of image data is sequentially written onto the buffer 28. However, the gate signal in the 2-times zoom mode assumes a high level only at a central portion of the 1-line period, as shown in FIG. 8(C), and accordingly the centrally five only of the 10 read requests shown in FIG. 8(B) are outputted to the memory control circuit 32. Due to this, the memory control circuit 32 reads 320-pixels image data out of the buffer 28 during a 1-line period, and writes it onto the SDRAM 34. In also a vertical direction, the gate circuit 64 outputs a gate signal shown in FIG. 8 for central 240 lines. As a result, in the 2-times zoom mode, the image data corresponding to 320 pixels×240 lines having been cut out from a screen center is written to the SDRAM 34.

In the 1-times zoom mode, a gate signal shown in FIG. 8(E) is outputted for each line. Due to this, all the read requests created by the TG 13 are inputted to the memory control circuit 32. However, in the 1-times zoom mode the image data to be written to the buffer 28 is one having been thinned out every other pixels, wherein read requests are outputted only five for each 1-line period. Accordingly, the image data written on the SDRAM 34 is pixel data with 320 pixels×240 lines that have been thinned out every other pixels.

As will be understood from the above explanation, the TG 13, the gate circuit 48 and the memory control circuit 32 constitute a cut-out circuit 49. The CPU 42 enables/disables this cut-out circuit 49 depending upon a mode. That is, if the normal camera mode is set, the cut-out circuit 49 is disabled with a result that the image data in VGA resolution outputted from the thin-out circuit 21 is written as it is onto the SDRAM 44. When the 1-times zoom mode is set, the cut-out circuit 49 is also disabled. In also this case, the image data in QVGA resolution outputted from the thin-out circuit 21 is also written as it is to the SDRAM 34. On the other hand, if a 2-times zoom mode is set, the cut-out circuit 49 is enabled so that part of the image data in VGA resolution outputted from the thin-out circuit 21 only is written to the SDRAM 34.

In this manner, in the normal camera mode both the thin-out circuit 21 and the cut-out circuit 49 are disabled. However, in the 1-times zoom mode the thin-out circuit 21 only is enabled, and in the 2-times zoom mode the cut-out circuit 49 only is enabled. That is, the CPU 42 in a zoom mode selectively enables the thin-out circuit 21 and the cut-out circuit 49.

Figure 9:
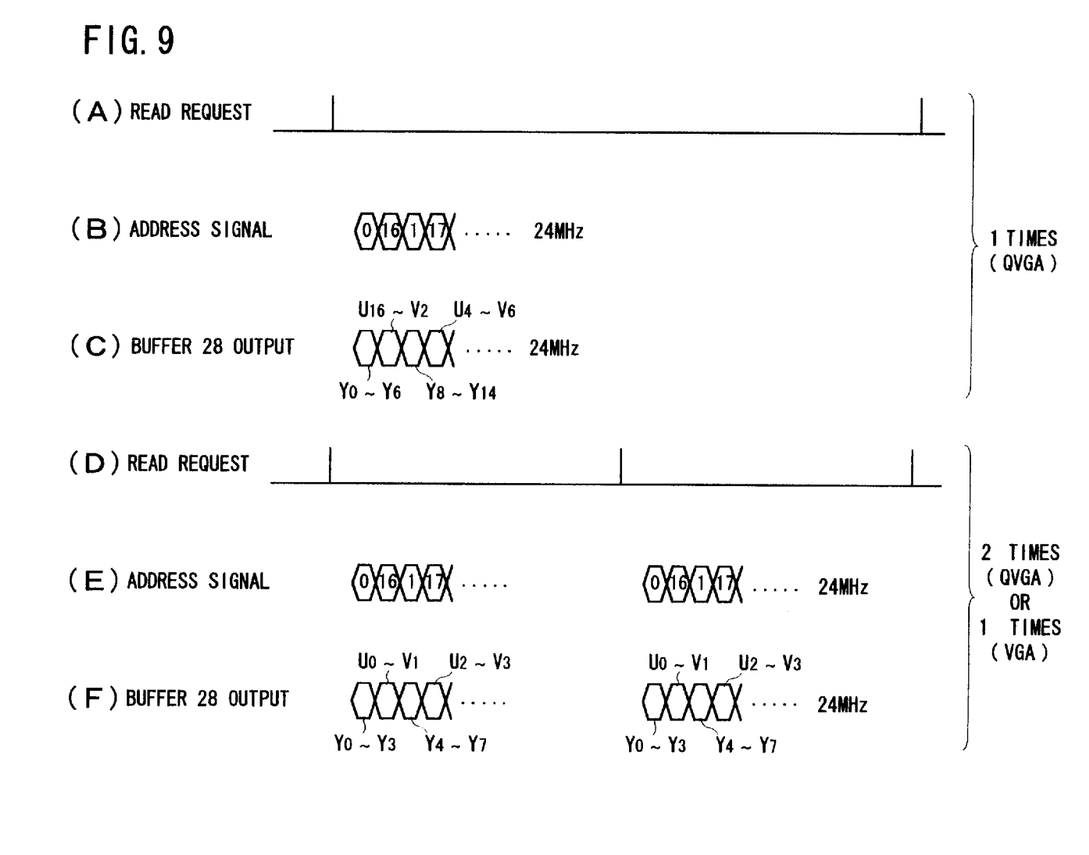
FIG. 9(A) and FIG. 9(D) are waveform diagrams showing read request.
FIG. 9(B) and FIG. 9(E) are waveform diagrams showing an address signal.
FIG. 9(C) and FIG. 9(F) are waveform diagrams showing a buffer output.

In the normal camera or 2-times zoom mode, a read request is inputted in timing shown in FIG. 9(D) while in the 1-times zoom mode a read request is inputted in timing shown in FIG. 9(A). The memory control circuit 32 responds to such a read request, and outputs an address signal at a rate of 24 MHz as shown in FIG. 9(B) or 9(E) and reads YUV data out of the buffer 28 as shown in FIG. 9(C) or 9(F). In this manner the memory control circuit 32 reads out image data at the rate 24 MHz, the read speed of which is 4 or 8 times the write speed of image data onto the buffer 28. In other words, the duration over which the buses 30 and 33 are occupied to write image data to the SDRAM 34 is ¼ or ⅛ of the total.

In a time period that the buses 30 and 33 are released open, the memory control circuit 32 reads image data from a SDRAM 34 by an interlace scan scheme and inputs the read data to an NTSC encoder 38. The NTSC encoder 38 encodes input image data with an NTSC format and supplies an obtained composite image signal onto the monitor 40. As a result, motion pictures are displayed in accordance with the mode on a screen. That is, in the normal camera mode is displayed a 1-times motion picture in VGA resolution. In the 1-times zoom mode, a 1-times motion picture is displayed in QVGA resolution. In the 2-times zoom mode, a 2-times motion picture is displayed in QVGA resolution.

Figure 3:
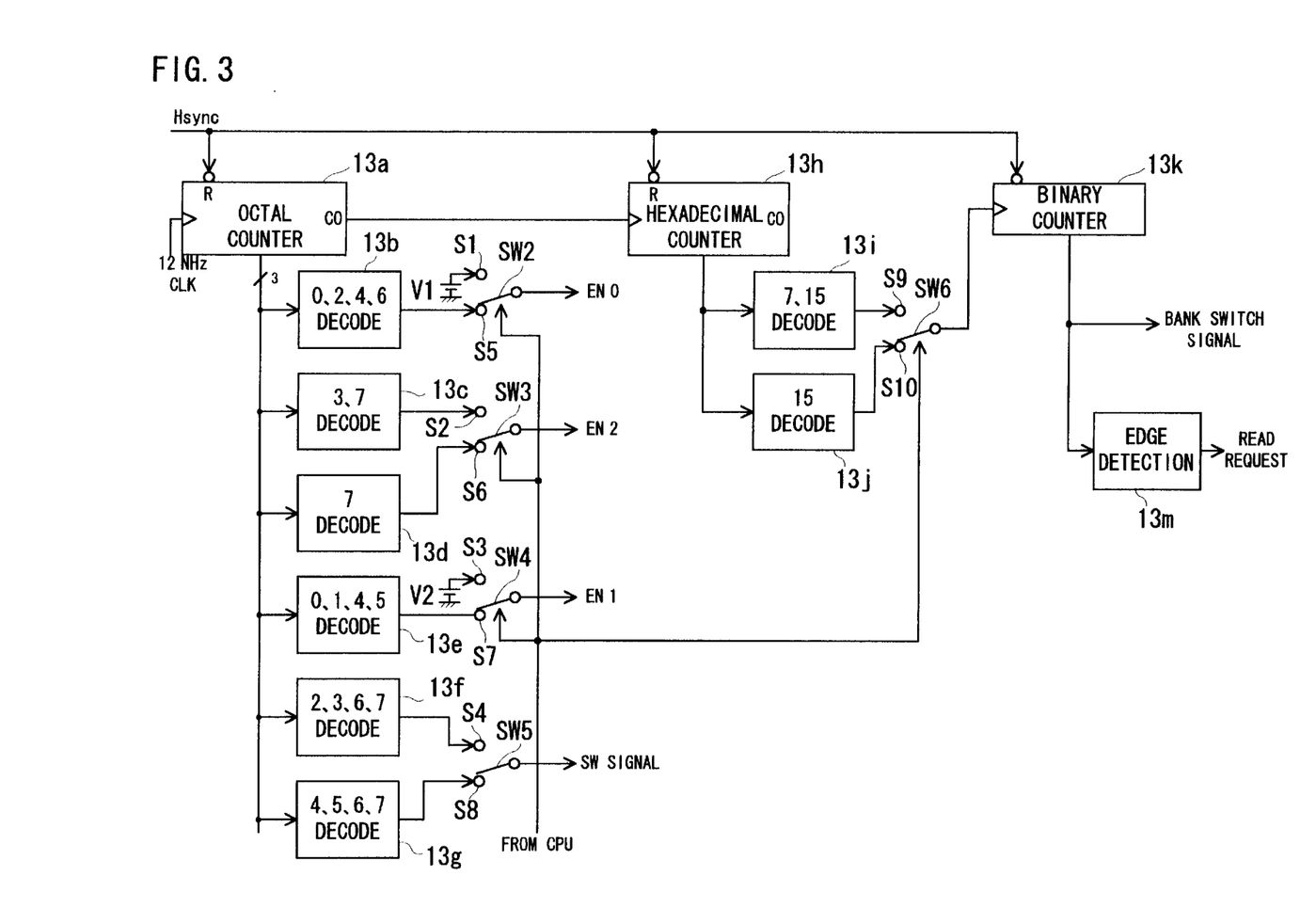
FIG. 3 is a block diagram showing one part of a timing generator.

The TG 13 is configured as shown in FIG. 3. The horizontal synchronizing signal from the SG 15 is inputted to respective reset terminals of an octal counter 13a, a hexadecimal counter 13h and a binary counter 13k. That is, each counter 13a, 13h, 13k is reset by the horizontal synchronizing signal. The octal counter 13a is incremented by a 12 MHz clock and outputs any of count values "0"–"7". The output count value is inputted to decoders 13b–13g. The decoder 13b, when having a count value "0", "2", "4" or "6", outputs a high level signal, while the decoder 13c outputs a high level signal when its count value is "3" or "7". Also, the decoder 13d outputs a high level signal when its count value is "7", while the decoder 13e outputs a high level signal when its count value is "0", "1", "4" or "5". Further, decoder 13f outputs a high level signal when its count value is "2", "3", "6" or "7", while the decoder 13g outputs a high level signal when its count value is "4"–"7".

The CPU 42 controls switches SW2–SW5 in accordance with the mode. That is, in the normal camera or 2-times zoom mode, the switches SW2–SW5 are respectively connected to terminals S1–S4. In the 1-times zoom mode, the switches SW2–SW5 are respectively connected to terminals S5–S8. Accordingly, the switches SW2 and SW4 are respectively connected to direct current power sources V1 and V2 when in the normal camera or 2-times zoom mode. These switches, in the 1-times zoom mode, are respectively connected to the decoders 13b and 13e. Meanwhile, the switches SW3 and SW5 are respectively connected to the decoders 13c and 13f when in the normal camera or 2-times zoom mode. These switches, in the 1-times zoom mode, are respectively connected to the decoders 13d and 13g.

The output of the switch SW2 is utilized as an enable signal EN0, and the output of the switch SW3 is an enable signal EN2. Also, the output of the switch SW4 is utilized as, an enable signal EN1, and the output of the switch SW5 is as an SW signal to control the switch SW1.

Consequently, in the normal camera or 2-times zoom mode, created are enable signals EN0–EN2 shown in FIGS. 6(E)–6(G) as well as an SW signal shown in FIG. 6(J). Also, in the 1-times zoom mode, created are enable signals EN0–EN2 shown in FIGS. 7(E)–7(G) as well as an SW signal shown in FIG. 7(J).

The hexadecimal counter 13h is incremented by a carry signal of the octal counter 13a whose count value is inputted to decoders 13i and 13j. The decoder 13i outputs a high level signal when the count value of the hexadecimal counter 13h is "7" or "15", while the decoder 13j outputs a high level signal when the count value of the hexadecimal counter 13h is "15". That is, the decoder 13i outputs high level signals at a interval of 64 pixels, and the decoder 13j outputs high level signals at an interval of 128 pixels. A switch SW6 is also controlled by the CPU 42. The switch SW6 is connected to a terminal S9 when in the normal camera or 2-times zoom mode, and to a terminal S10 when in the 1-times zoom mode.

The output of the switch SW6 is supplied to a clock terminal of a binary counter 13k. The binary counter 13k is incremented at an interval of 64 pixels when in the normal camera or 2-times zoom mode, and at an interval of 128 pixels when in the 1-times zoom mode. That is, the binary counter 13k has count values switched over between "0" and "1" every 114 or 128 pixels. The output of the binary counter 13k configured as this is used as a bank switch signal. The output of the binary counter 13k is also inputted to an edge detecting circuit 13m to thereby detect a rise or fall edge in a bank switch signal. The output of the edge detecting circuit 13m configured as this is used as a read request.

Consequently, in the normal camera or 2-times zoom mode a bank switch signal shown in FIG. 6(M) and a read request shown in FIG. 6(N) are created. In the 1-times zoom mode a bank switch signal shown in FIG. 7(M) and a read request shown in FIG. 7(N) are created.

Figure 4:
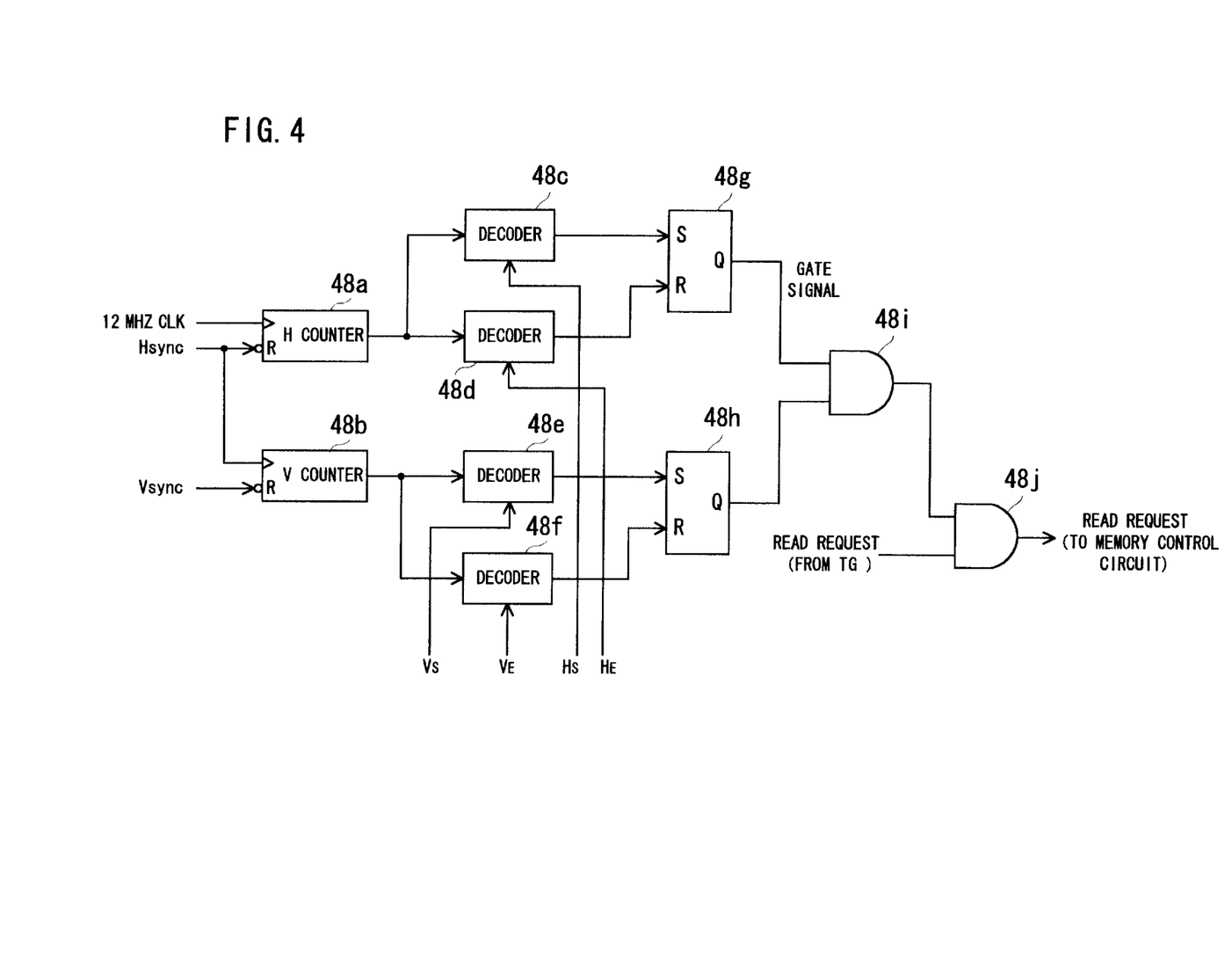
FIG. 4 is a block diagram showing one part of a gate circuit.

The gate circuit 48 is configured as shown in FIG. 4. An H counter 48a is incremented by a 12-MHz clock and reset by a horizontal synchronizing signal. On the other hand, a V counter 48b is incremented by the horizontal synchronizing signal and reset by a vertical synchronizing signal. Due to this, the edge counter 48a counts values, say "0"–"779", and V counter 48b counts values, say "0"–"559". The H counter 48a has an output horizontal count value inputted to decoders 48c and 48d, and the counter 48b has an output vertical count value inputted to decoders 48e and 48f.

Meanwhile, the CPU 42 sets predetermined numerical data $H_E$, $H_S$, $V_E$ and $V_S$ respectively to the decoders 48c–48f. The numerical data $H_S$ defines, in a horizontal direction, a rise position in a gate signal while the numerical data $H_E$ defines, in the horizontal direction, a fall position of the gate signal. Also, the numerical data $V_S$ defines, in a vertical direction, a rise position of a gate signal while the numerical data $V_E$ define, in the vertical direction, a fall position of the gate signal. Each of the numerical data $H_S$, $H_E$, $V_S$ and $V_E$ has a common value in the normal mode and the 1-times zoom mode. However, if a 2-times zoom mode is set, each of the numerical data $H_S$, $H_E$, $V_S$ and $V_E$ assumes a different value from that in the normal mode or 1-times zoom mode.

The decoders 48c–48f output a high level signal only when an input count value coincides with a value set therein. The decoders 48c and 48d have their outputs respectively to set and reset terminals of an RS-FF circuit 48g. The decoders 48e and 48f have their output respectively to set and reset terminals of an RS-FF circuit 48h. Accordingly, the output of the RS-FF circuit 48g rises when a horizontal count value coincides with the numeral data $H_S$, and falls when the horizontal count value coincides with the numeral data $H_E$. On the other hand, the output of the RS-FF circuit 48h rises when a vertical count value coincides with the numerical data $V_S$, and falls when the vertical count value coincides with the numerical data $V_E$. The respective outputs of the RS-FF circuits 48g and 48h are ANDed by an AND circuit 48i, thus eating a gate signal.

Due to this, the gate signal, in the normal or 1-times zoom mode, varies as shown in FIG. 8(E) and FIG. 8(G), while it varies as shown in FIG. 8(C) in the 2-times zoom mode.

An AND circuit 48j receives a read request outputted from the TG 13 and a gate signal outputted from the AND circuit 48i, and outputs a read request to the memory control circuit 32 only when the gate signal is at a high level.

Figure 5:
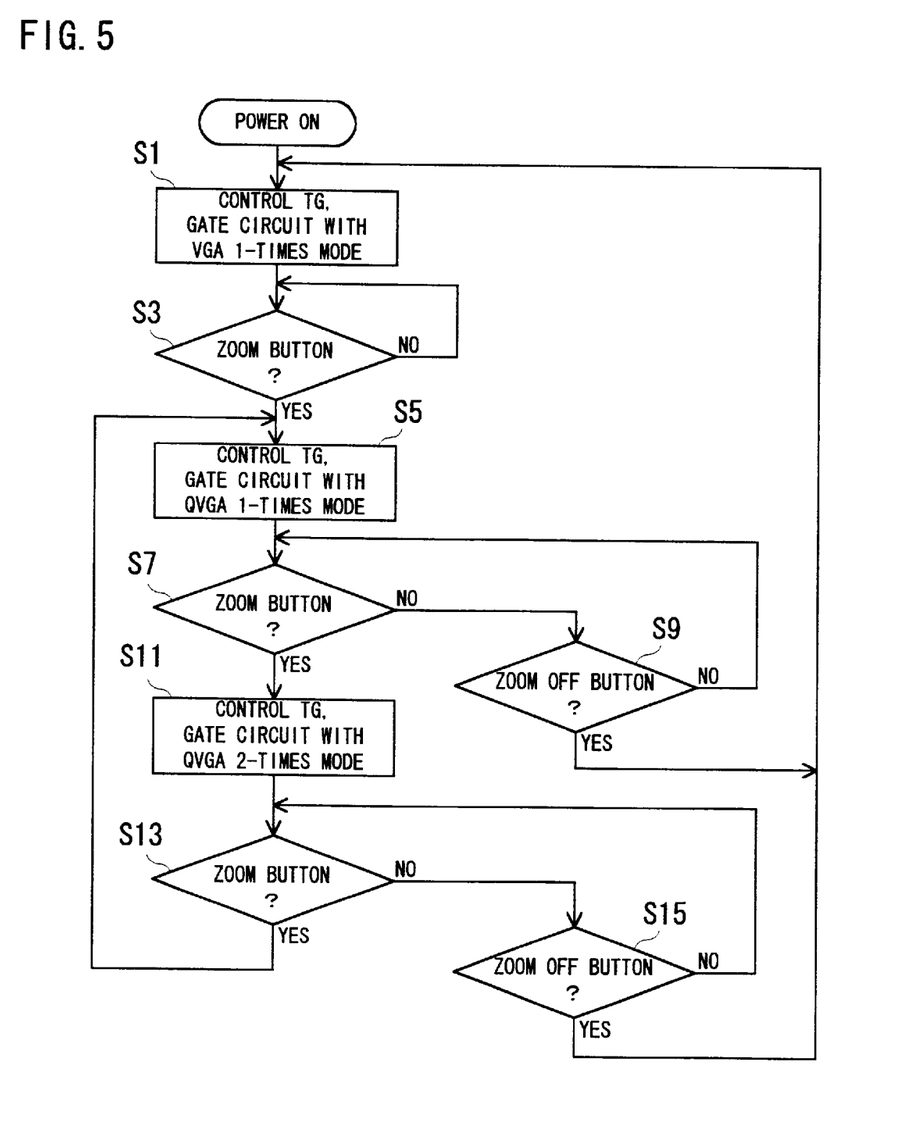
FIG. 5 is a flowchart showing one part of operation of a CPU.

The CPU 42 starts a flowchart process shown in FIG. 5, simultaneously with turning on the power. First, in step S1, the TG 13 and the gate circuit 48 are operated in VGA 1-times mode, i.e. usual camera mode. Specifically, the switches SW2 and SW5 shown in FIG. 3 are respectively connected to the terminals S1–S4, and the switches SW6 is connected to the terminal S9. Also, the numerical data $H_S$, $H_E$, $V_S$ and $V_E$ are respectively set in the decoders 48c–48f shown in FIG. 4. As a result, a 1-times motion picture with VGA resolution is displayed on the monitor 40.

The CPU 42 then determines in step S3 whether a zoom button 44 has been depressed. If "YES" here, in step S5 the TG 13 and the gate circuit 48 are operated in a QVGA 1-times mode, i.e. 1-times zoom mode. At this time, the switches SW2 and SW5 are respectively connected to the terminals S5–S8, and the switch SW6 is connected to the terminal S10. Also, the numerical data $H_S$, $H_E$, $V_S$ and $V_E$ are respectively set in the decoders 48c–48f, in order to create a gate signal shown in FIG. 8(E). As a result, a 1-times motion picture with QVGA resolution is displayed on the monitor 40.

The CPU 42 subsequently, in respective steps S7 and S9, monitors the operation of a zoom button 44 and zoom off button 46. If the zoom button 44 is again depressed, the CPU determines in step S7 "YES" and operates in step S11 the TG 13 gate circuit 48 in a QVGA 2-times mode, i.e. 2-times zoom mode. Due to this, switches SW2–SW5 are respectively connected to the terminals S1–S4, and the switch SW6 is connected to the terminal S9. Also, the numerical data $H_S$, $H_E$, $V_S$ and $V_E$ are respectively set to the decoders 48c–48f in a manner creating a gate signal shown in FIG. 8(G). As a result, a 2-times motion picture with QVGA resolution is displayed on the monitor 40.

On the other hand, if the zoom off button 46 is operated, the CPU 42 in step S9 determines "YES" to return the process to the step S1.

Ending the process of the step S11, the CPU 42 in respective steps S13 and S15 again monitors on the operation of the zoom button 44 and the zoom off button 46. If the zoom button 44 is depressed, the CPU determines in the step S13 "YES" to return the process to the step S5. However, if the zoom off button 46 is depressed, in step S15 "YES" is determined and the process returns to the step S1.

In this manner, if the zoom button 44 is once depressed, the resolution or a motion image to be displayed is set in QVGA. Each time the zoom button 44 is depressed, the zoom magnification is switched over between 1 times and 2 times. If the zoom off button 46 is depressed, the display image resolution returns to VGA.

Incidentally, in this embodiment explanations were made using the primary color filter having R, G and B arranged in a mosaic form. Alternatively, a complementary color filter having a mosaic arrangement with Ye, Cy, Mg and G may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for producing, based on an image signal having a first number of horizontal pixels which is outputted from an imaging device, an image signal having a second number of horizontal pixels in which the second number is smaller than the first number, comprising:

a thinning-out processor for performing a thinning-out process on the image signal having the first number of horizontal pixels so as to output the image signal having the second number of horizontal pixels;

a buffer for temporarily retaining pixel signals forming the image signal outputted from said thinning-out processor;

a reader for reading the pixel signals retained by said buffer at every third number of pixels in which the third number is smaller than the second number;

a thinning-out controller which enables said thinning-out processor when a first zoom magnification is selected, and disables said thinning-out processor when a second zoom magnification is selected; and a reading controller which activates said reader during a first time period which is associated with the first number of horizontal pixels when the first zoom magnification is selected, and activates said reader during a second time period which is associated with the second number of horizontal pixels when the second zoom magnification is selected, wherein said thinning-out processor outputs the image signal having the first number of horizontal pixels when disabled.

2. A digital camera according to claim 1, further comprising a request outputter for outputting a reading request at every time the pixel signals equal to the third number of pixels is written to said buffer, wherein said reading controller validates the reading request to be outputted during the first time period when the first zoom magnification is selected, and validates the reading request to be outputted during the second time period when the second zoom magnification is selected, and said reader reads the pixel signals equal to the third number of pixels from said buffer in response to the validated reading request.

3. A digital camera according to claim 1, wherein said thinning-out processor includes a plurality of registers for shifting predetermined pixels by predetermined pixels the image signal having the first number of horizontal pixels, and said thinning-out controller intermittently enables said plurality of registers when the first zoom magnification is selected, and continuously enables said plurality of registers when the second zoom magnification is selected.

4. A digital camera according to claim 3, wherein the image signal having the first number of horizontal pixels includes a Y signal, a U signal, and a V signal in which a data amount of each of the U signal and the V signal is half a data amount of the Y signal, and said plurality of registers includes a plurality of first registers for shifting the Y signal pixel by pixel and a plurality of second registers for alternately shifting one pixel of the U signal and one pixel of the V signal.

5. A digital camera according to claim 4, wherein the first zoom magnification is selected, said thinning-out controller intermittently enables said plurality of first registers in a ratio of a one pixel period to a two pixels period, and intermittently enables said plurality of second registers in a ratio of a two pixels period to a four pixels period.

* * * * *